No. 631,002. Patented Aug. 15, 1899.
A. I. VAN VRIESLAND.
CARBURETER.
(Application filed Apr. 21, 1899.)

(No Model.)

WITNESSES:
Ellen L. Giles

INVENTOR
Adolphe Isidore van Vriesland
BY
Richards
ATTORNEYS.

UNITED STATES PATENT OFFICE.

ADOLPHE ISIDORE VAN VRIESLAND, OF AMSTERDAM, NETHERLANDS.

CARBURETER.

SPECIFICATION forming part of Letters Patent No. 631,002, dated August 15, 1899.

Application filed April 21, 1899. Serial No. 713,966. (No model.)

*To all whom it may concern:*

Be it known that I, ADOLPHE ISIDORE VAN VRIESLAND, engineer, a subject of the Queen of the Netherlands, residing at Amsterdam, in the Netherlands, have invented a new and useful Improvement in Carbureting Apparatus, of which the following is a specification.

This invention relates to an improvement in the carbureting apparatus which forms the subject of my United States Patent No. 604,948, dated May 31, 1898. This apparatus consists in a cylinder divided by a partition in two compartments. In one of these compartments, filled to a suitable level with liquid hydrocarbon, is made to revolve a series of conduits helically wound around a drum and opening at one end into the drum-chamber and at the other end into a box disposed at the end of the drum, which has a passage to the second compartment. At each revolution of the drum the ends of the conduits scoop in turn alternately liquid hydrocarbon from the lower part of the drum-chamber—that is, from the compartment within which the drum revolves—and air from the upper space of the same and deliver this mixture into the said box, from where it passes, partly as evaporated hydrocarbon, into the second compartment, which I call the "compression-chamber."

The object of my present invention is to effect the discharge of non-evaporated hydrocarbon from each of the spiral conduits separately into the compression-chamber. For this purpose the said box is divided by partitions into as many compartments as there are special conduits, and each conduit is made to discharge through its own compartment into the compression-chamber.

The invention is illustrated in the annexed drawings.

Figure 1:
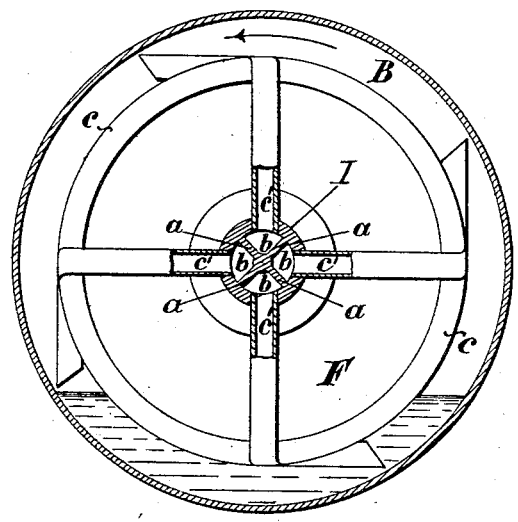
Figure 2:
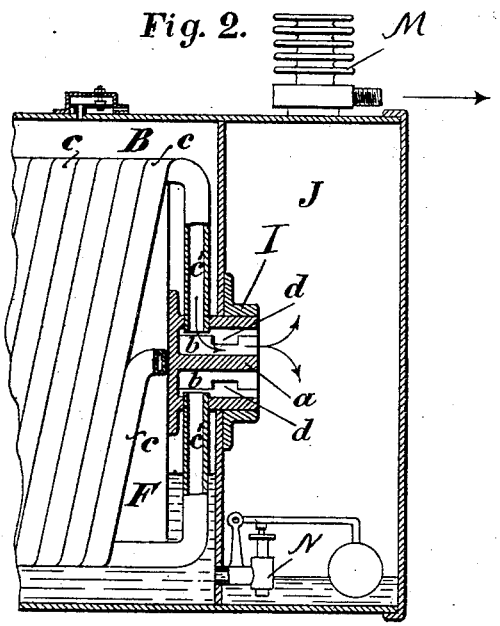

Figure 1 a cross-section, and Fig. 2 a longitudinal section, that part of the apparatus which has nothing to do with the present invention being cut away.

B and J are respectively the drum-chamber and the compression-chamber, into which the cylinder is divided. In B revolves the drum F, around which are wound the conduits $c$. These conduits open at one end (not shown in Fig. 2) into the drum-chamber and at the other end by radial conduits $c'$ into the box $b$. In order to prevent the non-evaporated hydrocarbon delivered by one of the conduits $c'$ into the box $b$ from passing directly into one of the other conduits which opens into the same box, I divide this box by partitions $a$ into as many compartments as there are conduits $c'$, so that each of the conduits discharges the still liquid hydrocarbon through its own compartment directly into the compression-chamber.

For the purpose of mixing together within the box I the evaporated hydrocarbon delivered therein by the conduits $c'$ I provide openings $d$ in the partitions and locate these openings so that they are not met by the discharged liquid.

M represents the expansion-valve at the gas-outlet, and N the liquid-return valve, both of which are described in my patent before referred to.

What I claim as my invention, and desire to secure by Letters Patent of the United States, is—

1. In a carbureting apparatus the combination with a cylinder divided by a partition into two chambers of a rotary drum mounted in one of the said chambers, a series of conduits helically wound around said drum and opening at one end into the drum-chamber, a box arranged at the end of the drum into which open the other ends of the conduits, and partitions in said box dividing the same into compartments which open directly into the second chamber, essentially as and for the purpose described.

2. In a carbureting apparatus the combination with a cylinder divided by a partition into two chambers of a rotary drum mounted in one of the said chambers, a series of conduits helically wound around said drum and opening at one end into the drum-chamber, a box arranged at the end of the drum into which open the other ends of the conduits, partitions in said box dividing the same into compartments which open directly into the second chamber, and openings provided in the said partitions, essentially as and for the purpose described.

In testimony whereof I have hereunto set my hand in presence of two subscribing witnesses.

ADOLPHE ISIDORE VAN VRIESLAND.

Witnesses:
THEODORUS JACOBUS KEYZER,
HENRI ANTOINE SCHMITT.